United States Patent
Habitz et al.

(10) Patent No.: US 8,571,825 B2
(45) Date of Patent: *Oct. 29, 2013

(54) DESIGN-DEPENDENT INTEGRATED CIRCUIT DISPOSITION

(75) Inventors: Peter Anton Habitz, Hinesburg, VT (US); Jinjun Xiong, White Plains, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,749

(22) Filed: Sep. 14, 2012

(65) Prior Publication Data

US 2013/0014075 A1    Jan. 10, 2013

Related U.S. Application Data

(63) Continuation of application No. 12/832,206, filed on Jul. 8, 2010.

(51) Int. Cl.
*G01R 31/3181* (2006.01)
*G06F 11/30* (2006.01)

(52) U.S. Cl.
USPC .......... 702/82; 324/759.03; 324/762.03; 324/762.06; 702/79; 702/117; 702/183; 716/108; 716/113; 716/136

(58) Field of Classification Search
USPC .......... 73/865.8; 324/500, 537, 759.01, 324/759.03, 762.01, 762.03, 762.06; 702/1, 702/57, 79, 81, 82, 108, 117, 118, 127, 182, 702/183, 187, 189; 716/100, 101, 106, 108, 716/111, 113, 136

IPC .......... G01R 31/00,31/28, 31/317, 31/3177, G01R 31/3181; G06F 11/00, 11/30, 11/32, G06F 17/00, 17/40, 19/00

See application file for complete search history.

(56) References Cited

U.S. PATENT DOCUMENTS

| | | | | |
|---|---|---|---|---|
| 2,767,914 | A | * | 10/1956 | Merrill et al. .......... 702/82 |
| 3,082,374 | A | * | 3/1963 | Buuck .......... 324/73.1 |
| 3,466,544 | A | * | 9/1969 | Balderston .......... 324/537 |
| 4,698,587 | A | * | 10/1987 | Burns et al. .......... 324/754.23 |
| 6,774,734 | B2 | | 8/2004 | Christensen et al. |
| 6,891,442 | B2 | | 5/2005 | Allen et al. |
| 6,934,671 | B2 | | 8/2005 | Bertsch et al. |
| 7,082,067 | B2 | | 7/2006 | Venkatraman et al. |
| 7,266,474 | B2 | | 9/2007 | Habitz et al. |
| 7,539,893 | B1 | | 5/2009 | Ferguson |

(Continued)

OTHER PUBLICATIONS

J. Xiong et al., "Optimal Margin Computation for At-Speed Test," International Conference on Design, Automation and Test in Europe, Mar. 2008, pp. 622-627, Munich, Germany.

(Continued)

*Primary Examiner* — Edward Cosimano
(74) *Attorney, Agent, or Firm* — Preston J. Young; Ryan, Mason & Lewis, LLP

(57) ABSTRACT

A method of integrated circuit (IC) disposition includes the steps of determining one or more disposition criteria based at least in part on statistical timing of a given IC design; and determining whether a given IC according to the given IC design satisfies the one or more disposition criteria based at least in part on one or more measurements of at least one test structure.

17 Claims, 6 Drawing Sheets

(56) References Cited

U.S. PATENT DOCUMENTS

| | | |
|---|---|---|
| 7,620,921 B2 | 11/2009 | Foreman et al. |
| 2009/0119629 A1 | 5/2009 | Grise et al. |
| 2009/0182522 A1 | 7/2009 | Visweswariah et al. |
| 2009/0234777 A1 | 9/2009 | Barnett et al. |

OTHER PUBLICATIONS

S-I. Ohkawa et al., "Analysis and Characterization of Device Variations in an LSI Chip Using an Integrated Device Matrix Array," IEEE Transactions on Semiconductor Manufacturing, May 2004, pp. 155-165, vol. 17, No. 2.

C. Visweswariah et al., "First-Order Incremental Block-Based Statistical Timing Analysis," Design Automation Conference, Jun. 2004, pp. 331-336.

Definition of "statistical" from "Free Merriam-Webster Dictionary" downloaded from merriam-webster.com/dictionary/statistical on Feb. 26, 2013, 3 pages.

Definition of "statistic" from "Free Merriam-Webster Dictionary" downloaded from merriam-webster.com/dictionary/statistic on Feb. 26, 2013, 2 pages.

* cited by examiner

DESIGN-DEPENDENT INTEGRATED CIRCUIT DISPOSITION

CROSS-REFERENCE TO RELATED APPLICATION

This application is a Continuation of pending U.S. patent application Ser. No. 12/832,206, filed on Jul. 8, 2010, the disclosure of which is incorporated herein by reference.

FIELD

The field is directed generally toward integrated circuit (IC) manufacturing, and more particularly to characterization of manufactured ICs.

BACKGROUND

One major concern in IC design is that timing misalignments could result in race conditions. A race condition or race hazard is a flaw in an electronic system or process whereby an output and/or result of the system or process is unexpectedly and critically dependent on the sequence or timing of other events. Data should generally arrive at a component (e.g., latch or flip-flop) a prescribed amount of time before a clock signal (e.g., setup time) and data should be stable for a prescribed amount of time until new data arrives (e.g., hold time). If the data and clock signals are not synchronized in this manner, unpredictable and undesirable results could occur.

A common metric utilized in timing analysis is "slack," which is typically defined as the difference between the expected time of data arrival and the actual time of data arrival. Negative slack means that the data is delayed, so the clock speed must be decreased accordingly. Conversely, positive slack indicates that the data is early, so the clock speed could be increased. If a manufactured IC has any negative slacks, it is often considered to be defective and is discarded.

Manufactured ICs are subject to wide performance distributions due to manufacturing process variations, and the like, which can cause timing misalignments, including negative slacks. Accordingly, it is necessary to test the ICs prior to deployment (e.g., shipping to a customer or using in a product). Typical methods of testing ICs include an at-speed structure test (ASST) and functional testing. However, it is often desirable to perform an initial screening of ICs even before the final testing of the IC. This screening, commonly known as IC disposition, allows for the discovery of ICs which would otherwise be incapable of passing the next stages of testing, thus allowing for these ICs to be identified and discarded earlier in the testing process.

SUMMARY

A method of IC disposition includes the steps of determining one or more disposition criteria based at least in part on statistical timing of a given IC design; and determining whether a given IC according to the given IC design satisfies the one or more disposition criteria based at least in part on one or more measurements of at least one test structure, including, for example, frequency measurements of at least one performance sensitive ring oscillator (PSRO).

Illustrative embodiments of the invention advantageously consider IC design in determination of criteria for IC disposition, thus resulting in acceptance regions which more closely mirror operational regions. Such illustrative embodiments advantageously increase both the yield and the quality of an IC manufacturing process.

These and other objects, features, and advantages of the invention will become apparent from the following detailed description of illustrative embodiments thereof, which is to be read in connection with the accompanying drawings.

DETAILED DESCRIPTION OF PREFERRED EMBODIMENTS

Principles of the present invention will be described herein in the context of illustrative embodiments of an apparatus and methodology for utilizing performance (or process) sensitive ring oscillators (PSROs) for testing ICs. It is to be appreciated, however, that the invention is not limited to the specific apparatus and methods illustratively shown and described herein. Rather, aspects of the invention are directed broadly to techniques for determining IC disposition which takes IC design into consideration. Instead of PSRO measurements, the performance parameters of circuit elements can be estimated from measurements of other test structures, including, for example, individual transistors and wires. These test structures can be implemented either directly on the IC die area or on the wafer outside the individual ICs, such as, for example, in the region used for separating IC chips from each other (e.g., scribe region). The parameters of circuit elements can also be obtained from measurements of path propagation delays for some signal propagation paths.

Figure 1:
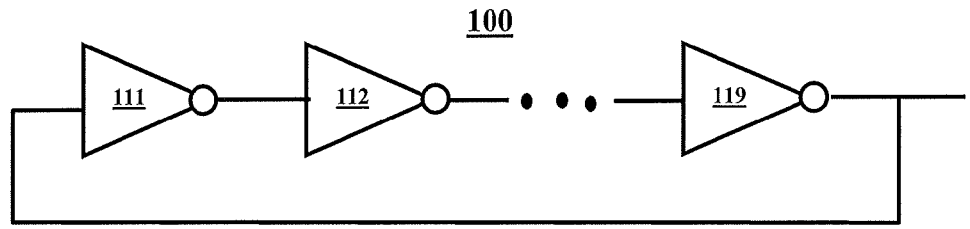
FIG. 1 is a schematic diagram depicting an exemplary process sensitive ring oscillator (PSRO).

One exemplary technique for determining IC disposition involves the use of PSROs, such as the exemplary PSRO 100 shown in FIG. 1. PSRO 100 is only one example of a test structure suitable for use with an illustrative embodiment of the present invention. The test structure(s) used for determining IC dispostion is(are) preferably design-independent and process-dependent. PSRO 100 comprises a chain of inverters 111, 112, . . . 119, or alternative delay stages. It is to be understood that a PSRO may include any number of delay stages, particularly when non-inverting stages are used for PSRO, although an odd number of inverting stages is typically used. PSRO 100 is designed to reflect the switching speed of complementary metal-oxide-semiconductor (CMOS) transistors, although the invention is not limited to the use of CMOS transistors.

More particularly, a PSRO may be designed to reflect the switching speed of a particular family of CMOS transistors. CMOS transistors are typically grouped in families such that transistors within a family may share common characteristics (e.g., threhsold voltage, etc.), while transistors in different families may share different characteristics.

For example, CMOS transistors could be grouped into families based on voltage threshold (VT). Low voltage threshold (LVT) transistors typically have faster switching speeds but higher leakage (and hence higher power consumption), while high voltage threshold (HVT) transistors generally have slower switching speeds but lower leakage (and hence lower power consumption) by comparison. Other families are possible, such as, for example, standard voltage threshold (SVT) and regular voltage threshold (RVT), which represent compromises between LVT and HVT.

Figure 2:
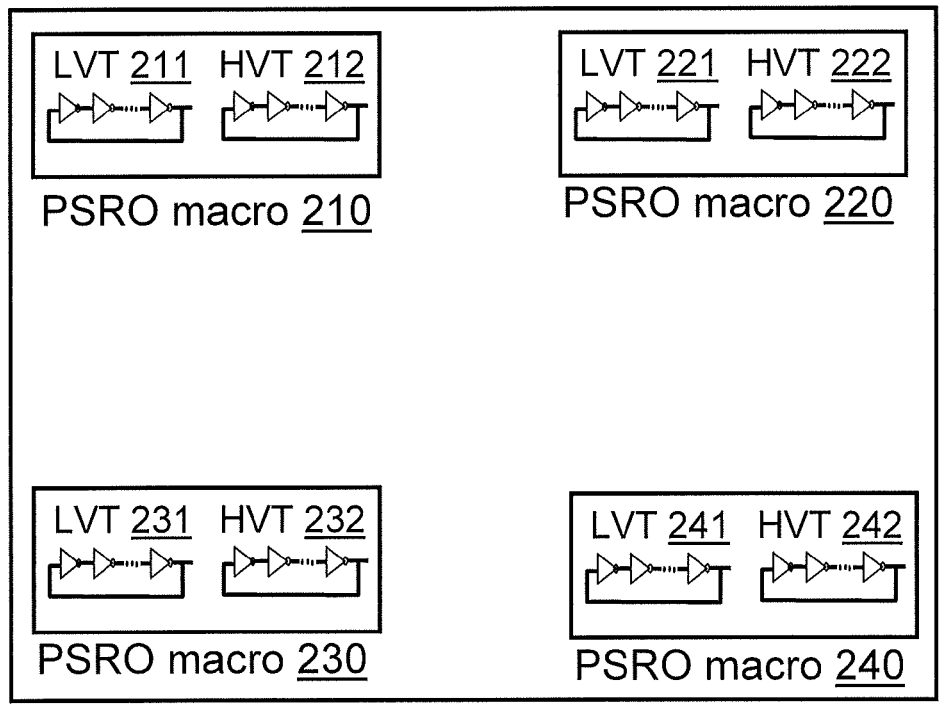
FIG. 2 is a block diagram showing an exemplary IC including a plurality of PSRO macro blocks.

In designing an IC, such as IC 200 shown in FIG. 2, it is often desirable to include one or more PSRO macros, such as PSRO macros 210, 220, 230 and 240, to allow for PSRO-based IC disposition. It is often desirable to distribute multiple PSRO macros on the IC. As apparent from FIG. 2, for example, a PSRO macro may be placed in each corner of the IC so as to more accurately characterize variations which may be present throughout (e.g., across) the IC.

Each of the PSRO macros shown in FIG. 2 preferably includes a PSRO for each of a plurality of CMOS transistor families, and each of these PSROs may have a structure similar to PSRO 100 in FIG. 1, although alternative arrangements are similarly contemplated by the invention. More particuarly, PSRO macro 210 in the upper-left corner of IC 200 includes LVT PSRO 211 and HVT PSRO 212, PSRO macro 220 in the upper-right corner of IC 200 includes LVT PSRO 221 and HVT PSRO 222, PSRO macro 230 in the lower-left corner of IC 200 includes LVT PSRO 231 and HVT PSRO 232, and PSRO macro 240 in the lower-right corner of IC 200 includes LVT PSRO 241 and HVT PSRO 242.

Figure 3:
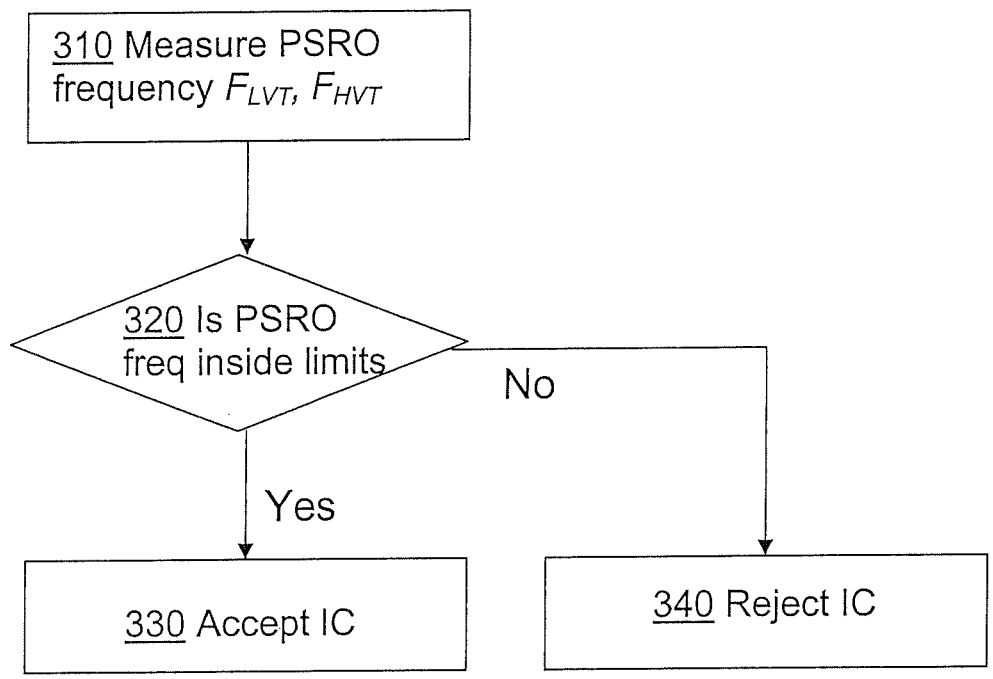
FIG. 3 is a logical flow diagram showing an exemplary PSRO-based IC disposition technique.

FIG. 3 is a logical flow diagram showing an exemplary PSRO-based IC disposition methodology 300. In step 310 of method 300, PSRO frequencies are measured. For example, one could measure the frequencies of LVT PSRO 221 ($F_{LVT}$) and of HVT PSRO 222 ($F_{HVT}$). The frequency associated with a given PSRO is generally the free-running frequency of the ring oscillator, which may be a function of one or more process-dependent or other parameters (e.g., voltage, temperature, etc.) of transistors and/or other elements forming the ring oscillator. In step 320, it is determined whether the PSRO frequencies are within prescribed limits. There is typically a minimum and maximum limit for the PSRO frequencies associated with each family. This step is described in further detail below. If the PSRO frequency is within the limits, the IC is accepted for ASST in step 330. If the PSRO frequency is outside the limits, the IC is rejected and discarded in step 340.

Figure 4A:
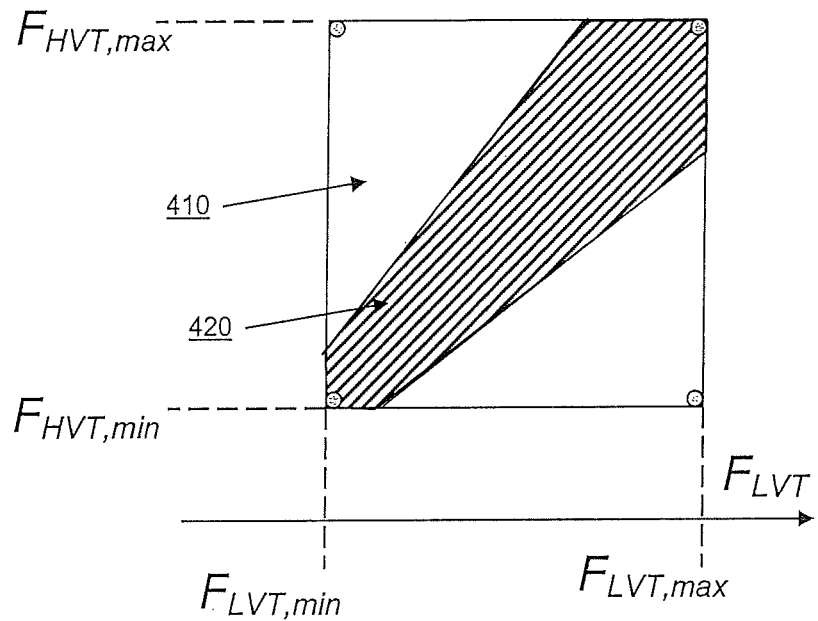
FIG. 4A illustrates an exemplary design-independent acceptance region.

In one embodiment, step 320 could comprise accepting ICs with LVT PSRO frequencies within preset limits and HVT PSRO frequencies within preset limits. These limits could be plus or minus three standard deviations ($\pm 3\sigma$) from a desired value. The tests performed in such an embodiment would be $F_{LVT,min} < F_{LVT} < F_{LVT,max}$ and $F_{HVT,min} < F_{HVT} < F_{HVT,max}$. This will cause the rectangular acceptance region designated as 410 in FIG. 4A, bounded by the four shaded points, to be used.

However, it could also be desirable to ensure that PSRO delays are correlated among different families. For example, if LVT PSRO 221 (FIG. 2) is fast, HVT PSRO 222 should also be fast. Thus, in addition to or instead of the tests described in the precending paragraph, one could also only accept ICs within correlation limits: $F_{LVT/HVT,min} < F_{LVT/HVT} < F_{LVT/HVT,max}$. This will cause the acceptance region designated as 420 in FIG. 4A, with diagonal lines running from the lower left to the upper right, to be used instead of acceptance region 410.

It should be noted that both acceptance region 410 and acceptance region 420 are design-independent. In other words, the timing requirements of the specific IC design are not considered in formulating the tests. Accordingly, the actual operational region (in which the IC will be operable) may be different from the acceptance region. This is shown in FIG. 4B.

Figure 4B:
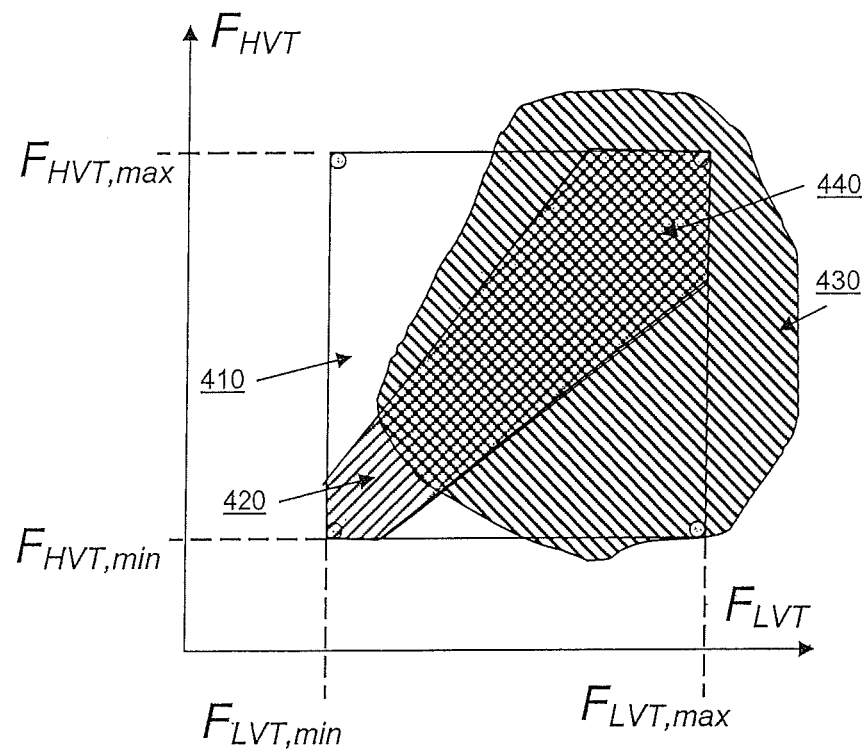
FIG. 4B shows a comparison between the exemplary acceptance region of FIG. 4A and an illustrative actual operational region.

With reference to FIG. 4B, operational region 430 is shown with diagonal lines running from the lower right to the upper left. As can be seen in FIG. 4B, only region 440, with intersecting diagonals, falls within both operational region 430 and acceptance region 420. A similar result is achieved if acceptance region 410 is used instead. Accordingly, some of the rejected ICs (such as an IC at the end of the arrow leading from reference numeral 430) in fact satisfy performance requirements, which lowers yield, and some of the accepted ICs (such as an IC at the end of the arrow leading from reference numeral 420) do not satisfy performance requirements, resulting in lower quality. Because potentially functional ICs are disposed prior to other stages of IC testing (e.g., ASST and/or functional testing), design-independent disposition may lead to reduced yields.

Although described herein using two transistor families, it should be understood that the techniques of the present invention may be applied to ICs having any number N of transistor families, which will result in an N-dimensional acceptance region and an N-dimensional operational region, where N is an integer.

Figure 5:
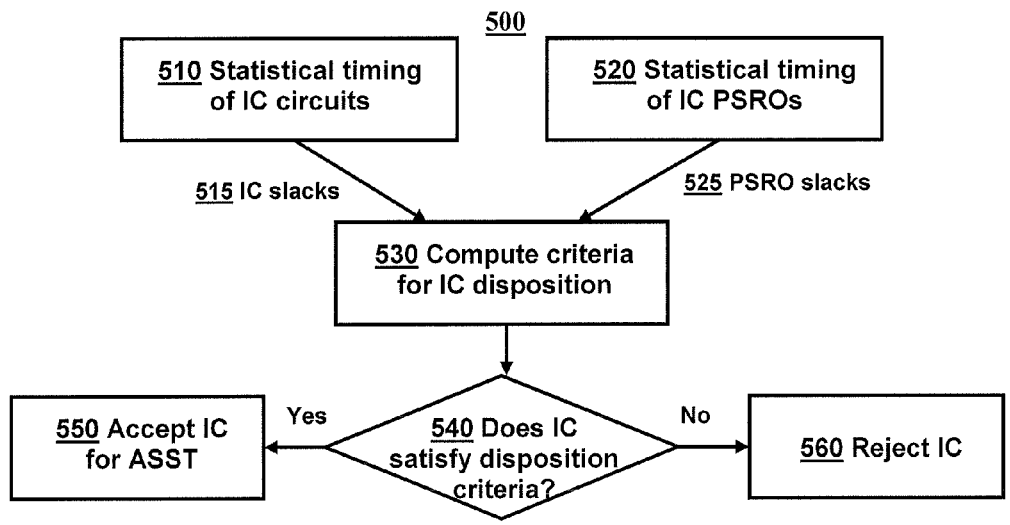
FIG. 5 is a logical flow diagram depicting an exemplary IC disposition technique, according to an illustrative embodiment of the present invention.

FIG. 5 is a logical flow diagram depicting an exemplary IC disposition method 500, according to an illustrative embodiment of the present invention. In step 510, statistical timing of the IC is performed in order to determine IC slacks 515. An exemplary technique for statistical timing which could be used with an illustrative embodiment of the present invention is described in C. Visweswariah et al., "First-Order Incremental Block-Based Statistical Timing Analysis," *DAC* 2004, pp. 331-336, June 2004. Other statistical timing techniques known to those skilled in the art could also be utilized. In step 520, statistical timing of the PSRO is performed to determine PSRO slacks 525.

In step 530, criteria for IC disposition are computed. It is important to note that, in contrast with the techniques described above, these criteria are preferably design-aware, and could be specific for each IC designed depending on the results of the statistical timings performed in steps 510 and 520. For example, if the statistical timings determine that there is low sensitivity to LVT switching speed, a less strict criterion could be used for LVT switching speed, thus allowing for increased yield without reduced quality.

In step 540, a determination is made as to whether the IC satisfies the disposition criteria computed in step 530. If the IC satisfies these disposition critera, the IC is accepted for ASST in step 550. If the IC does not satisfy these disposition criteria, the IC is rejected and discarded in step 560.

In order to compute the criteria for IC disposition in step 530, a timing slack for a given end-point is represented in functional form then decomposed by separating the terms that can be estimated through PSRO frequency measurements from other variations. For example, the timing slack could be represented in linear canonical form:

$$s_{0,h} + s_{hvt,h}\Delta X_{hvt} + s_{lvt,h}\Delta X_{lvt} + \sum_{other\_variations} s_{i,h}\Delta X_i + s_{R,h}\Delta R > 0$$

The left side of the above inequality presents a linear canonical form of the slack associated with a given end-point (e.g., a latch). It should be noted that timing slack could also be represented in, for example, quadratic form or any other polynomial form. In this embodiment, ICs are only accepted if the slack associated with each end-point is positive. In other embodiments, it may be desirable to only accept ICs if the slack is greater than some other value to provide a safety margin.

In the above inequality, $s_{hvt,h}\Delta X_{hvt} + s_{lvt,h}\Delta X_{lvt}$ represents variations of the timing slack due to variations of the parameters that can be estimated from PSRO measurements. More particularly, $s_{hvt,h}$ represents a sensitivity of the timing slack to HVT switching speed and $s_{lvt,h}$ represents a sensitivity of the timing slack to LVT switching speed, and are determined through the statistical timings of the circuits performed in step 510. As used herein, $\Delta X_{hvt}$ represents the variation of the switching speed of HVT transistors (e.g., 221 in FIG. 2) and $\Delta X_{lvt}$ represents the variation of the switching speed of LVT transistors (e.g., 222 in FIG. 2).

The remaining terms represent variations which cannot be estimated through measurements of PSRO frequency. Here, $s_{0,h}$ represents a mean or nominal value which does not depend on any other parameters, $s_{i,h}$ represent sensitivities of the timing to various global sources of variation (e.g., such variations as negative bias temperature instability (NBTI), metal, temperature, across-chip, systemic, random and other variations) and $\Delta X_i$ represents the variation of these global sources of variation from their nominal values. $\Delta R$ represents the variation of an independent random variable from its nominal value and $s_{R,h}$ is the sensitivity of the timing to this independent random variable.

The statistical timing of the PSROs performed in step 520 computes PSRO delays as functions of the transistor switching speed. For example, the delay of HVT PSRO may be represented as follows:

$$D_{hvt} = d_{hvt,0} + d_{hvt}\Delta X_{hvt},$$

where $d_{hvt,0}$ is the mean value of PSRO delay, $d_{hvt}$ is the sensitivity of PSRO delay to the variations $\Delta X_{hvt}$ of the switching speed of HVT transistors. Similar representations can be obtained for PSROs of other VT families.

The statistical timing is not the only method for computing PSRO delay as a function of transistor switching speed contemplated by the invention. For example, such computation can be done by statistical regression of the results of Monte-Carlo simulation at the transistor level. Adjoint sensitivity analysis is another technique which may be used for computing PSRO delay dependence on transistor switching speed.

The oscillation frequency of a PSRO is inversely proportional to its delay. Therefore, by combining the above equation for PSRO delay with the measured PSRO frequency, we can estimate the actual values of variations of transistor switching speed.

The slack inequality is then preferably rewritten to isolate the variations that can be estimated from the PSRO frequency measurements from the other unpredictable variations:

$$s_{hvt,s}\Delta X_{hvt} + s_{lvt,s}\Delta X_{lvt} > -s_{0,s} - \sum_{other\_variations} s_{i,s}\Delta X_i - s_{R,s}\Delta R$$

Then, all variations are projected except the variations corresponding to the PSROs:

$$s_{hvt,s}\Delta X_{hvt} + s_{lvt,s}\Delta X_{lvt} >$$
$$Proj\left(-s_{0,s} - \sum_{other\_variations} s_{i,s}\Delta X_{i,s} - s_{R,s}\Delta R\right) = R_{Proj}$$

$R_{Proj}$ is preferably a conservative projection in which all worst cases are assumed, such as $3\sigma$ values. The inequality $s_{hvt,s}\Delta X_{hvt} + s_{lvt,s}\Delta X_{lvt} > R_{Proj}$ can then be used as a constraint for IC disposition. Additional criteria can be constructed from additional end-point slacks.

The slack associated with a given end-point can be also computed in a form different from the linear form. For example, the slack can be computed in a polynomial form or other functional form. The similar inequality of the testing criteria can be constructed from slack expressed in functional forms different from linear ones.

More generally, inequalities can be created for each of a variety of latch timing tests. There may be several timing tests, and hence several constraints, for each latch. For example, setup tests may be performed to ensure that a data signal arrives before a clock signal, and hold tests may be performed to ensure that the data signal is stable after the clock signal. Also, there may be a desired minimum width between a signal's rise and fall. As such, there may be many constraints for a given IC.

Figure 6:
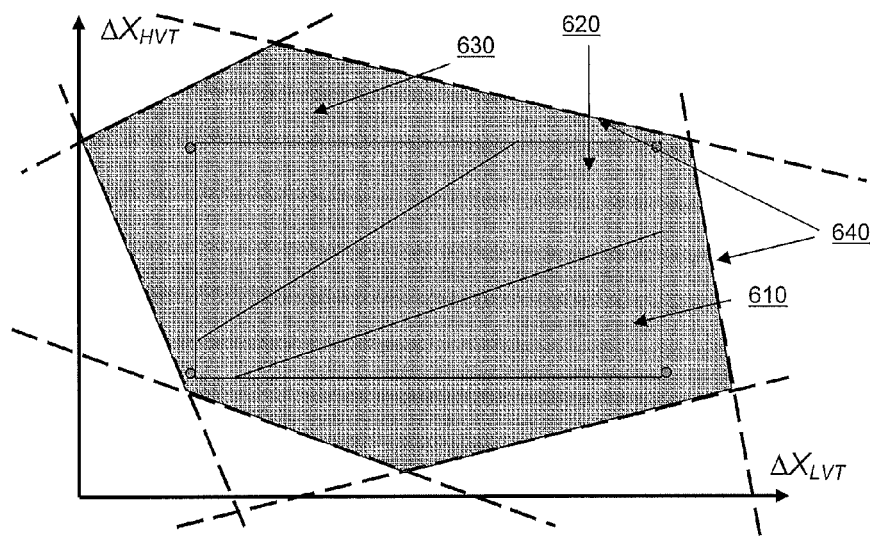
FIG. 6 shows an exemplary acceptance region, according to an illustrative embodiment of the present invention.

FIG. 6 shows an exemplary acceptance region, according to an embodiment of the present invention. As apparent from the figure, regions 610 and 620 represent device-independent acceptance regions, respectively, corresponding to acceptance regions 410 and 420 shown in FIG. 4. Region 630 is an acceptance region according to an illustrative embodiment of the present invention, and it represents the region within which all of the linear inequality constraints shown as dotted lines, such as those labeled as 640, are satisfied. Each of the dotted lines represents an inequality of the form $s_{hvt,s}\Delta X_{hvt} + s_{lvt,s}\Delta X_{lvt} > R_{Proj}$ discussed above, corresponding to an IC timing test. In the illustrative embodiment shown in FIG. 6, it can be clearly seen that acceptance region 630 is larger than acceptance regions 610 or 620, which will advantageously result in higher yields. While this is often the case, such occurrence is not obligatory. Ideally, acceptance region 630 is closer to the operational region of the IC than acceptance regions 610 or 620, which will advantageously result in higher quality.

The number of timing slacks to be considered could be quite large. As discussed above, each latch or other combinatorial logic element within an IC could have one or more timing slacks associated therewith. This could result in hundreds of thousands of timing slacks, and hence hundreds of thousands of constraints. It could therefore be advantageous to reduce the number of constraints so as to reduce the complexity of the IC disposition criteria.

One way to do this would be to compute a smaller number of equivalent timing slacks by grouping highly correlated timing slacks into clusters, noting that higher correlation will provide greater accuracy for combining several slacks together. Then, for each cluster, a cluster slack could be computed as a statistical MIN of its constituent timing slacks. An exemplary statistical MIN function suitable for use with an illustrative embodiment of the present invention is described in the above-cited Visweswariah paper. The cluster slacks can then be transformed into IC disposition constraints using the techniques discussed above with reference to FIG. 5. If the cluster slack is positive, then all of its constituent timing slacks will be positive, and the constraint is met.

Figure 7:
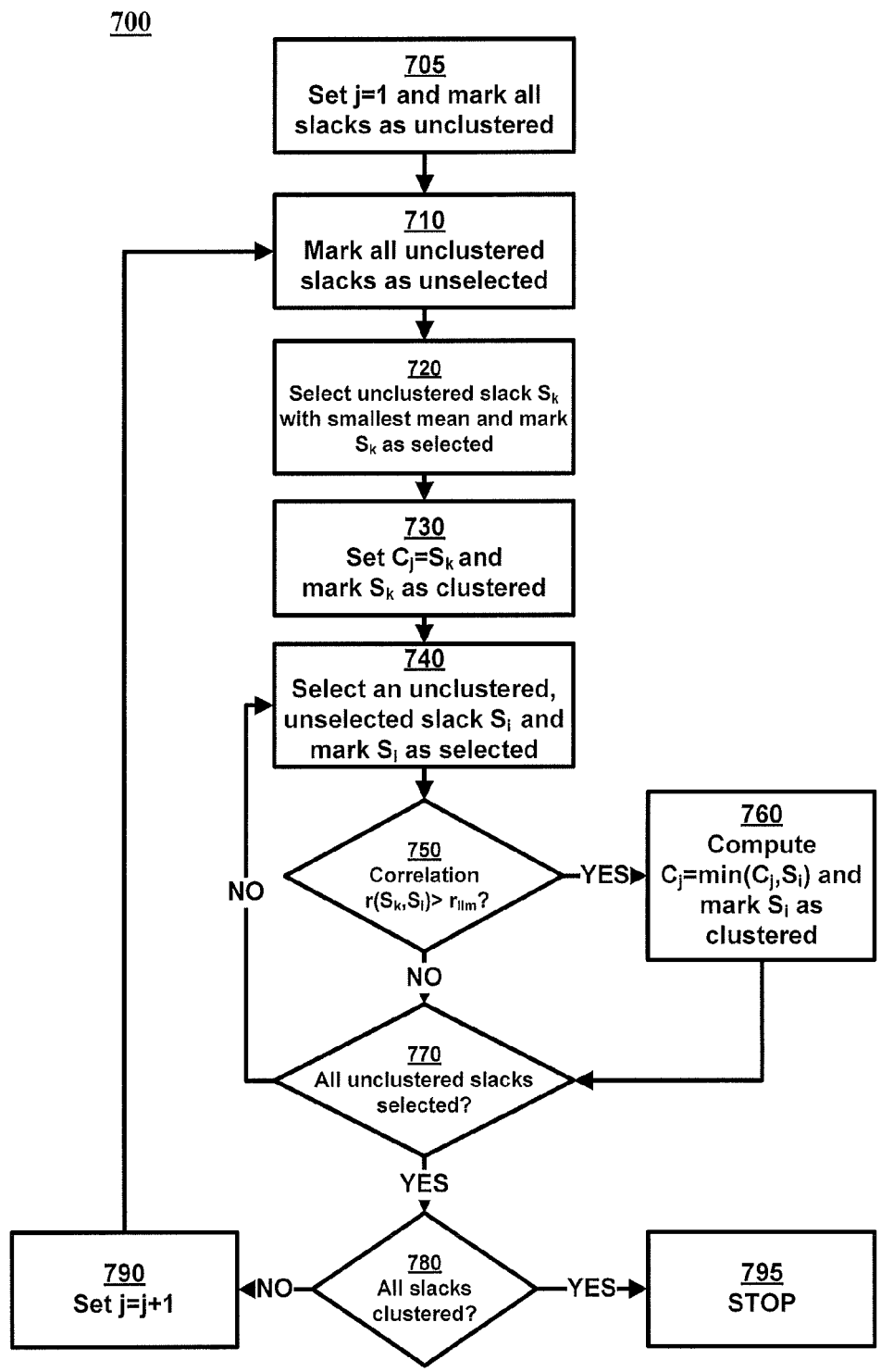
FIG. 7 is a logical flow diagram depicting an exemplary methodology for slack clustering, according to an embodiment of the present invention.

FIG. 7 is a logical flow diagram depicting an exemplary methodology 700 for slack clustering, according to an embodiment of the present invention. Of course, as will be understood by one skilled in the art given the teachings herein, other clustering techniques could be utilized. Method 700 is preferably operative to convert a set of n timing slacks, S, of IC timing tests $\{S_1, S_2, \ldots, S_n\}$ and to produce a set of m cluster slacks $\{C_1, C_2, \ldots, C_m\}$ for use in IC disposition, preferably with m≤n.

Method 700 begins in step 705 wherein a cluster counter variable, j, is set equal to 1 and all slacks within S are marked as unclustered, as no slacks have been added to any clusters yet. In step 710, all unclustered slacks are marked as unselected. In step 720, a determination is made as to which unclustered slack has the smallest mean value. This slack is then labeled $S_k$ and marked as selected. In step 730, $C_j$ is set equal to $S_k$, representing the initialization of a new cluster, and $S_k$ is accordingly marked as clustered.

In step 740, an unclustered, unselected slack $S_i$ is selected and consequently marked as selected. In step 750, a determination is made as to whether the correlation between $S_k$ and $S_i$ is greater than a threshold. If so, then $S_i$ should be clustered with $S_k$ within cluster $C_j$ and the method proceeds to step 760.

In step 760, $S_i$ is added to cluster $C_j$ and marked as clustered. More particularly, $C_j$ is set equal to the minimum of $C_j$ and $S_i$. This is because it is presumed that if the minimum slack within a cluster of highly correlated slacks is satisfied, the other slacks within that cluster will also be satisfied. Thus, we need only keep track of the minimum slack for each cluster.

Following step 760, and also following the no branch of step 750, the method proceeds to step 770. In step 770, a determination is made as to whether all unclustered slacks have been selected (i.e., whether each slack not already in a cluster has been examined to determine whether it should be included in the current cluster $C_j$).

If there are unclustered slacks which have not been selected, method 700 returns to step 740, where another unclustered, unselected slack $S_i$ is selected. Otherwise, the method proceeds to step 780, in which a determination is made as to whether all slacks have been clustered. If unclustered slacks remain, the method proceeds to step 790, in which j, the cluster counter, is incremented, and then to step 710, which begins the processing of the next cluster. Otherwise, if all slacks have been clustered, the method terminates in step 795.

The correlation threshold used in step 750 as clustering criterion controls the number of clusters and correspondingly the number of clusters slacks $\{C_1, C_2, \ldots, C_m\}$ created by the algorithm 700. The larger the correlation threshold the fewer cluster slacks are created and the smaller is the number of constraint of the resulting chip disposition criterion. The above procedure can also be extended to explicitly control of the final resulting number of cluster slacks.

As will become apparent to one skilled in the art that aspects of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Such a system may include distinct software modules (for example, a partitioning module executing on a hardware processor). Furthermore, embodiments of the present invention may take the form of a computer program product embodied in one or more computer readable medium(s) having computer readable program code embodied thereon.

Additionally, the techniques as heretofore described can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement embodiments of the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 8:
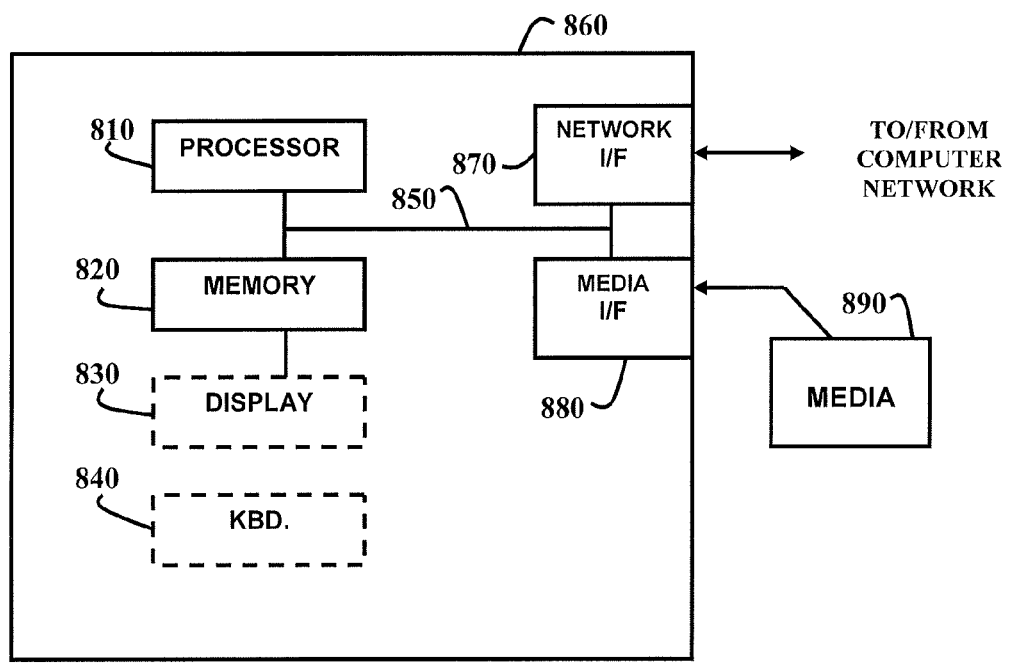
FIG. 8 is a block diagram depicting a computer system that may be useful in implementing one or more aspects and/or elements of the present invention according to an embodiment thereof.

One or more embodiments can make use of software running on a general purpose computer or workstation. With reference to FIG. 8, such an implementation employs, for example, a processor 810, a memory 820, and an input/output interface formed, for example, by a display 830 and a keyboard 840. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 810, memory 820, and input/output interface such as display 830 and keyboard 840 can be interconnected, for example, via bus 850 as part of a data processing unit 860. Suitable interconnections, for example via bus 850, can also be provided to a network interface 870, such as a network card, which can be provided to interface with a computer network, and to a media interface 880, such as a diskette or CD-ROM drive, which can be provided to interface with media 890.

Accordingly, computer software including instructions or code for performing the methodologies of embodiments of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, embodiments of the invention can take the form of a computer program product accessible from a computer-usable or computer-readable medium (for example, media 890) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

A data processing system suitable for storing and/or executing program code can include at least one processor 810 coupled directly or indirectly to memory elements 820 through a system bus 850. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 840, display 830, pointing device, and the like) can be coupled to the system either directly (such as via bus 850) or through intervening I/O controllers (omitted for clarity).

Network adapters such as network interface 870 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 860 as shown in FIG. 8) running a server program. It will be understood that such a physical server may or may not include a display and keyboard.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application-specific integrated circuit(s) (ASICs), functional circuitry, one or more appropriately programmed general purpose digital computers with associated memory, and the like. Given the teachings of embodiments of the invention provided herein, one of ordinary skill in the related art will be able to contemplate other implementations of the components of embodiments of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for use in integrated circuit (IC) disposition, the apparatus comprising:
   a processor; and
   a memory coupled to the processor; wherein the processor is operative to perform the steps of:
   determining one or more disposition criteria based at least in part on statistical timing of a given IC design; and
   determining whether a given IC according to the given IC design satisfies the one or more disposition criteria based at least in part on one or more measurements of at least one test structure performed on the at least one test structure without measuring a functional part of an IC chip.

2. The apparatus of claim 1, wherein the one or more disposition criteria are specific to the given IC design.

3. The apparatus of claim 1, wherein the at least one test structure comprises at least one design-independent test structure.

4. The apparatus of claim 1, wherein the one or more measurements of the at least one test structure comprise one or more frequency measurements of at least one performance sensitive ring oscillator (PSRO).

5. The apparatus of claim 1, wherein a given criterion of the one or more disposition criteria comprises a comparison between at least one term computed from the one or more measurements of the at least one test structure and at least one term not computed from the one or more measurements of the at least one test structure.

6. The apparatus of claim 5, wherein the at least one term not computed from the one or more measurements of the at least one test structure comprises a projection of at least one variation not associated with the at least one test structure.

7. The apparatus of claim 5, wherein a given term of the at least one term computed from the one or more measurements of the at least one test structure comprises (i) a timing variation associated with a given test structure and (ii) a sensitivity of the given IC design to the timing variation associated with the given test structure.

8. The apparatus of claim 7, wherein the timing variation associated with the given test structure is determined by frequency measurements of the given test structure.

9. The apparatus of claim 7, wherein the sensitivity of the given IC design to the timing variation associated with the given test structure is determined by the statistical timing of the given IC design.

10. A computer program product comprising a non-transitory computer readable recordable storage medium including computer usable program code for integrated circuit (IC) disposition, the computer program product comprising computer usable program code, which when executed by a processor, performs the steps of:
    determining one or more disposition criteria based at least in part on statistical timing of a given IC design; and
    determining whether a given IC according to the given IC design satisfies the one or more disposition criteria based at least in part on one or more measurements of at least one test structure performed on the at least one test structure without measuring a functional part of an IC chip.

11. The computer program product of claim 10, wherein the one or more disposition criteria are specific to the given IC design.

12. The computer program product of claim 10, wherein the at least one test structure comprises at least one design-independent test structure.

13. The computer program product of claim 10, wherein the one or more measurements of the at least one test structure comprise one or more frequency measurements of at least one performance sensitive ring oscillator (PSRO).

14. The computer program product of claim 10, wherein a given criterion of the one or more disposition criteria comprises a comparison between at least one term computed from the one or more measurements of the at least one test structure and at least one term not computed from the one or more measurements of the at least one test structure.

15. The computer program product of claim 14, wherein a given term of the at least one term computed from the one or more measurements of the at least one test structure comprises (i) a timing variation associated with a given test structure and (ii) a sensitivity of the given IC design to the timing variation associated with the given test structure.

16. An apparatus for use in integrated circuit (IC) disposition, the apparatus comprising:
    a processor; and
    a memory coupled to the processor; wherein the processor is operative to perform the steps of:
    determining one or more disposition criteria based at least in part on statistical timing of a given IC design; and
    determining whether a given IC according to the given IC design satisfies the one or more disposition criteria based at least in part on one or more measurements of at least one test structure, wherein the one or more measurements of the at least one test structure comprise one or more frequency measurements of at least one performance sensitive ring oscillator (PSRO).

17. A computer program product comprising a non-transitory computer readable recordable storage medium including computer usable program code for integrated circuit (IC) disposition, the computer program product comprising computer usable program code, which when executed by a processor, performs the steps of:
    determining one or more disposition criteria based at least in part on statistical timing of a given IC design; and
    determining whether a given IC according to the given IC design satisfies the one or more disposition criteria based at least in part on one or more measurements of at least one test structure, wherein the one or more measurements of the at least one test structure comprise one or more frequency measurements of at least one performance sensitive ring oscillator (PSRO).

* * * * *